(12) United States Patent
Buta et al.

(10) Patent No.: US 9,016,035 B2
(45) Date of Patent: Apr. 28, 2015

(54) DUNNAGE INSERTER SYSTEM

(75) Inventors: John R. Buta, Salem, OH (US); John H. Gehring, Canfield, OH (US)

(73) Assignee: Butech Bliss, Salem, OH (US)

( * ) Notice: Subject to any disclaimer, the term of this patent is extended or adjusted under 35 U.S.C. 154(b) by 1245 days.

(21) Appl. No.: 12/772,712

(22) Filed: May 3, 2010

(65) Prior Publication Data

US 2010/0275557 A1 Nov. 4, 2010

Related U.S. Application Data

(60) Provisional application No. 61/174,691, filed on May 1, 2009, provisional application No. 61/297,105, filed on Jan. 21, 2010.

(51) Int. Cl.
*B65B 55/20* (2006.01)
*B65B 23/00* (2006.01)
*B65B 23/20* (2006.01)
*B65G 57/00* (2006.01)

(52) U.S. Cl.
CPC .................. *B65B 55/20* (2013.01); *B65B 23/20* (2013.01); *B65G 57/005* (2013.01)

(58) Field of Classification Search
CPC .......................................................... B65B 23/00
USPC ........................ 53/473, 474, 111 R, 147, 235
See application file for complete search history.

(56) References Cited

U.S. PATENT DOCUMENTS

| | | | |
|---|---|---|---|
| 5,645,392 A | 7/1997 | Leichty et al. | |
| 6,672,037 B2 | 1/2004 | Wehrmann | |
| 7,479,100 B2 | 1/2009 | Toth | |
| 7,503,738 B1 | 3/2009 | Doyle | |
| 2008/0098699 A1 | 5/2008 | Cheich et al. | |
| 2008/0307756 A1* | 12/2008 | Meessen | 53/473 |
| 2009/0064638 A1 | 3/2009 | Corbett et al. | |
| 2009/0075800 A1 | 3/2009 | Wetsch et al. | |

* cited by examiner

*Primary Examiner* — Michelle Lopez
(74) *Attorney, Agent, or Firm* — Fay Sharpe LLP; James E. Scarbrough

(57) ABSTRACT

A dunnage inserter system has one or more storage containers for storage of a plurality of dunnage pieces. A trolley and lift assembly travels horizontally along a longitudinal axis of an overhead beam. A dunnage holder is mounted to the trolley and lift assembly and moves horizontally along the overhead beam and moves vertically via a lift assembly. The dunnage holder can lift and hold one or more dunnage pieces for installation onto a metal sheet in the metal sheet container.

15 Claims, 13 Drawing Sheets

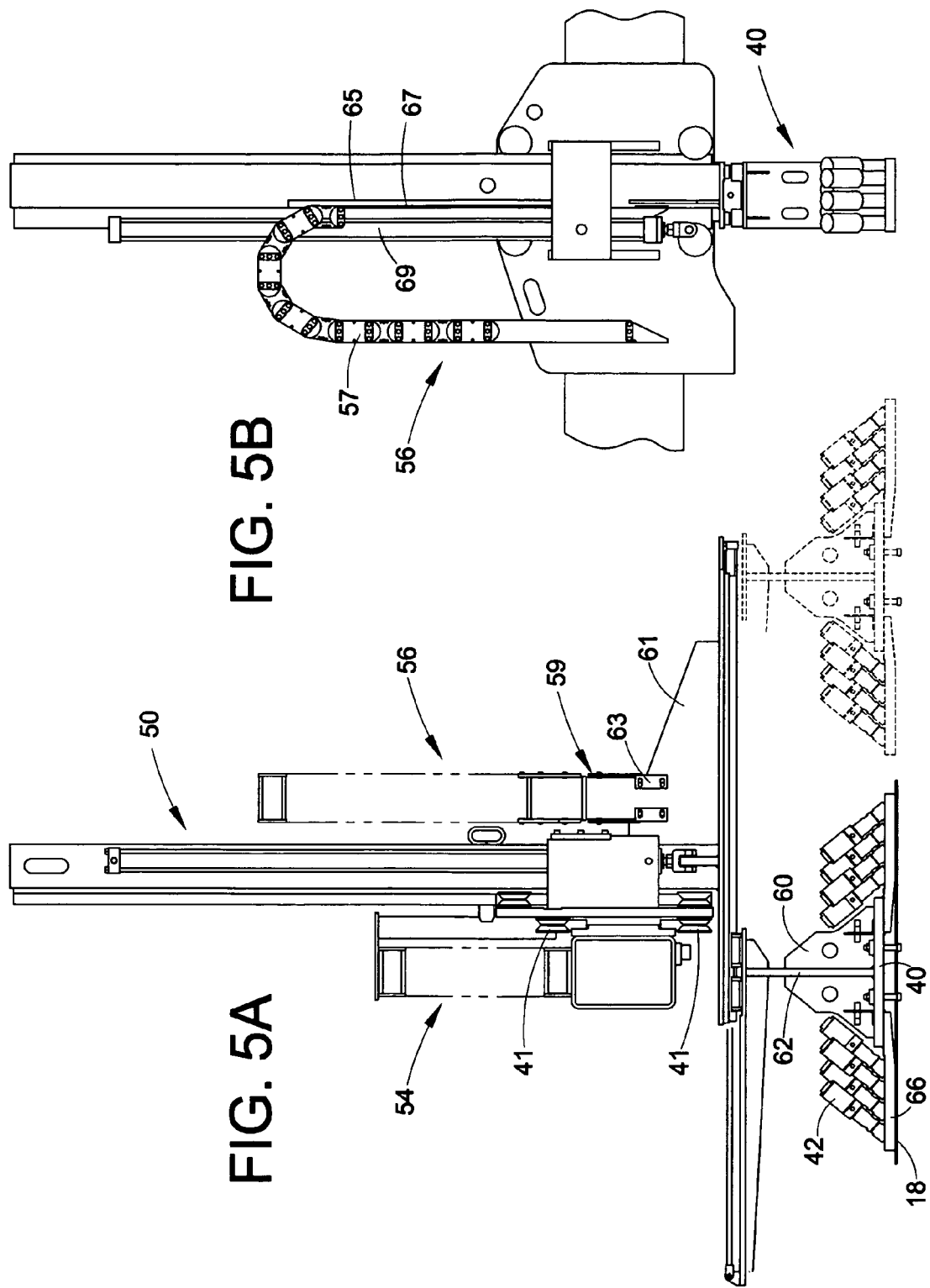

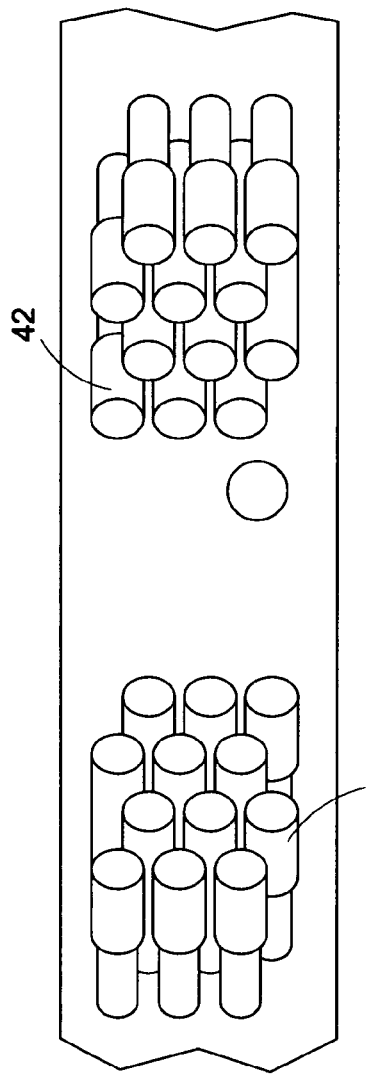
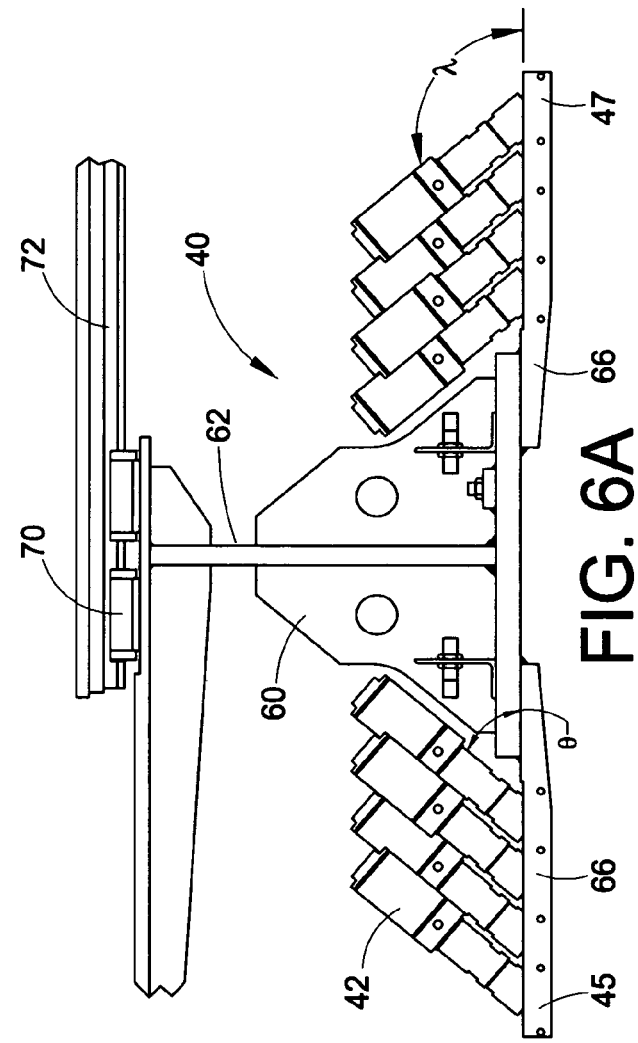
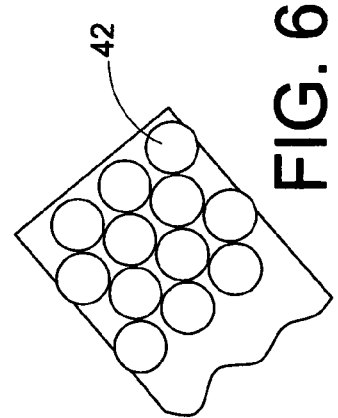
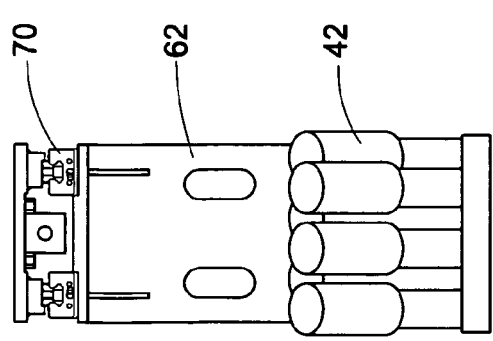

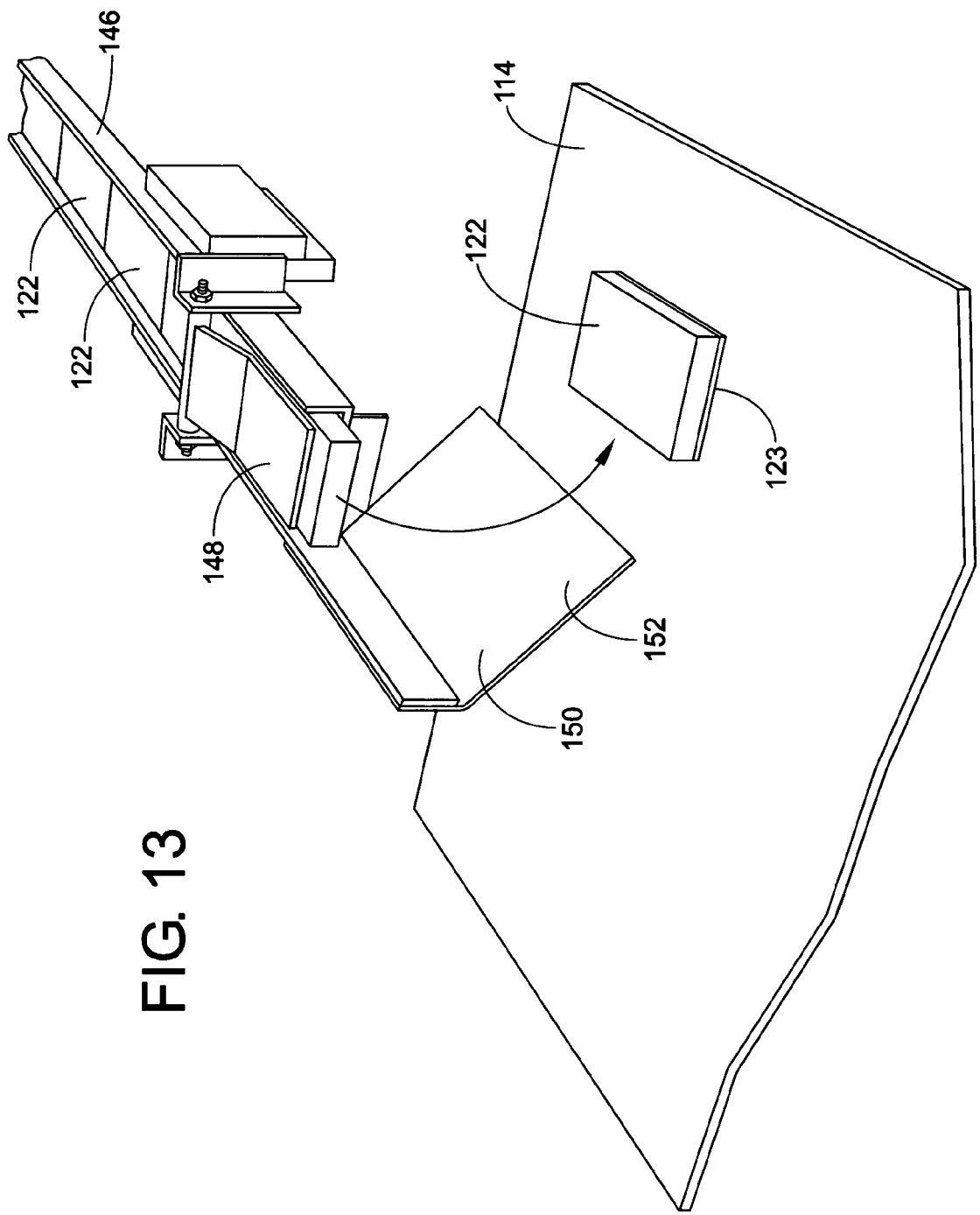

DUNNAGE INSERTER SYSTEM

CLAIM OF PRIORITY

This application claims priority from U.S. Provisional Application Ser. Nos. 61/174,691 filed on May 1, 2009 and 61/297,105 filed on Jan. 21, 2010, each of which is hereby incorporated by reference.

BACKGROUND OF THE DISCLOSURE

The disclosure relates to dunnage insertion systems. More particularly, it relates to an automated dunnage inserter system. It also relates to a discrete dunnage insertion system or a device that automatically inserts dunnage between metal sheets in the stacker section of a metal cut to length line.

In the metals industry there are process lines typically known as "Cut to Length Lines" that automatically cut metal strip material that is fed from a coil. The coil is unwound, the strip is flattened and then a measured length of the strip is fed past a cutting shear and then on to a stacking device.

The shear cuts the strip and the length of strip that is supported in the stacking device is released and allowed to drop onto a stack of previously cut strips. When the stack reaches a predetermined count or number of pieces, there is the need to insert spacers, known as "dunnage", to separate the counted "pack" from subsequent pieces that will continue to be dropped on the stack.

Separating the stack of strips or pieces into counted piece packs can be accomplished by stopping the line and manually inserting the dunnage, or else the stack can continue to build higher than the required piece count. This large stack can be subsequently separated into counted packs after the stack is run out of the stacker area. Both of these approaches reduce productivity and require manual labor.

During operation, a sheet is placed in the shipping or packing container or area, then the dunnage is placed in the container to serve as spacers on top of one of the sheets, then another sheet is placed in the container, and so on. The dunnage pieces are spaced apart from each other along a length of the sheet. In some existing systems, nails are used to penetrate the dunnage and wedge into the dunnage board to prevent dropping the dunnage as it is moved to the packing container. One or more dunnage pieces are lifted by a holder and are lowered and placed in a spaced apart manner in the container or storage area.

Automation can be used for the movement of the dunnage pieces, instead of moving them by hand, which results in an increase in time and cost efficiency results. Over packing or under packing of the dunnage is minimized, thus maximizing the use of dunnage pieces, and the packers are free to work on other tasks.

In the process of shipping one or more articles in a container, a packer typically manually places some type of dunnage material in the shipping container along with the articles. The dunnage material can partially or completely fill the empty space and fill the void around the articles in the container. The dunnage material helps prevent or minimizes any shifting of the articles in the container and/or cushions the articles in the container during the shipping process. Some commonly used dunnage materials are plastic foam, air bags or sheets or boards of material such as wood.

In the process of shipping one or more articles from one location to another, a packer can manually top-fill a container in which one or more articles have been placed with dunnage to partially or completely fill the void around the article or articles and thereby prevent or minimize any shifting movement of the objects relative to the container and/or to provide cushioning for the articles in the container.

The packer typically observes the container as it is being filled with dunnage and stops adding dunnage when the container appears to be full. One problem with manually packing the container is that some packers tend to over-fill the container, with the result that more dunnage material might have been placed in the container than is needed to adequately protect the article. At other times, a packer might under-fill the container, in which case the article might be free to move around in the container during shipment, increasing the possibility of damage.

Thus, there is a need for an automated system for efficiently dispensing the proper amount of dunnage into a container of sheet material for shipment. It is also desired to have a system which automatically inserts discrete dunnage into a stack of strips or pieces which overcomes the above-mentioned deficiencies and others while providing better and more advantageous overall results, such as improving the overall productivity and safety of the process.

SUMMARY OF THE DISCLOSURE

The present disclosure is related to dunnage insertion systems. More particularly, it relates to an automated dunnage insertion system or device that automatically inserts dunnage between metal sheets in the stacker section of a metal cut to length line.

In particular, the present disclosure provides a packaging system that includes a supply of dunnage pieces, packing or installing stations, and an automated distribution assembly that selectively distributes the dunnage products from the supply to selected packing stations. The distribution assembly includes a dunnage holder system for receiving dunnage products.

The present disclosure provides an automatic system and method for inserting dunnage, particularly strips or boards or rounds of dunnage, into a packing or shipping container, thereby avoiding or minimizing the need for a packer to manually insert dunnage, and freeing the packer for other tasks.

The automatic dunnage dispensing system automatically fills the void between one or more objects such as sheets of metal which have been placed for shipping, and more particularly to a dunnage system and method for automatically dispensing a piece of dunnage between sheets of material.

In accordance with one aspect of the disclosure, a dunnage inserter system includes at least one storage container for storage of a plurality of dunnage pieces; an overhead beam which extends from at least one storage rack to a stack of metal sheets; a trolley and lift assembly slidably mounted to the overhead beam assembly to travel horizontally along a longitudinal axis of the overhead beam; and a dunnage holder which is mounted to said trolley and lift assembly; wherein the dunnage holder moves horizontally along the overhead beam and moves vertically via the lift assembly; wherein the dunnage holder can lift and hold one or more dunnage pieces for installation onto a metal sheet.

In accordance with another aspect of the disclosure, a method of inserting dunnage onto a metal sheet storage rack includes providing a container storing a plurality of dunnage pieces; providing an overhead beam extending between the container storing a plurality of dunnage pieces and the metal sheet storage rack; providing a trolley and lift assembly on the overhead beam; providing a dunnage holder mounted to the trolley and lift assembly; moving the dunnage holder to a position above the dunnage container; lowering the dunnage holder via the trolley and lift assembly until the holder contacts at least one of the dunnage pieces; engaging the dunnage piece with the holder; lifting the holder and the dunnage piece(s) via the trolley and lift assembly; moving the dunnage holder and the at least one dunnage piece over the metal storage rack; lowering the dunnage piece(s) onto a metal sheet within the metal storage rack; and releasing the dunnage piece(s) onto the metal sheet.

In accordance with another aspect of the disclosure, a dunnage inserter system has a container storing a plurality of dunnage pieces; wherein the container has an ejector chamber formed at a bottom of the container; an opening formed in the chamber for ejecting a dunnage piece from the container; a slide mechanism for pushing a dunnage piece out of the ejector chamber through the opening of the ejection chamber; and a discharge chute for receiving dunnage pieces ejected from the container and dropping dunnage pieces onto a metal sheet.

In accordance with another aspect of the disclosure, a method of discharging dunnage onto a metal sheet includes: providing a container for stacking a plurality of dunnage pieces; ejecting a piece of dunnage from the container by pushing the piece of dunnage through an ejector opening formed in the container via an ejector slide; moving the dunnage through a discharge chute such that dunnage pieces are positioned adjacent each other along a length of the discharge chute; dropping a piece of dunnage onto a discharge gate of the chute when one of the dunnage pieces is ejected out of the container; dropping the piece of dunnage onto a drop arm; pivoting the drop arm so that the dunnage piece drops onto a metal sheet.

Still another aspect of the present disclosure is an automated dunnage dispensing system which picks up a single piece of dunnage using a robotic arm and places it in the container.

Another aspect of the disclosure is a magazine for storing a number of pieces of dunnage. The magazine stores the dunnage in a generally vertical orientation, such that gravity assists the feeding of rounds or dunnage into the ejection zone. Springs or other additional force means can be used to feed the dunnage. Dunnage can be added to the magazine by direct manual insertion or by entry chutes that direct the rounds to the magazine, thus keeping the loading zone further away from the process line. The magazine confines and organizes the rounds such that rounds will not jam as they progressively drop into the ejection chamber.

The preferred shape factor of the dunnage is a rectangle or round of sufficient thickness to allow easy separation of the counted packs. The dunnage material can be made of wood (such as a common 2"×4") or a hockey puck, or any suitably economic material that has low rebound properties. The dunnage could also have magnetic properties to secure itself to the sheet in various orientations. Several dunnage pieces (such as up to ten or more pieces) can be spaced along the metal sheet.

Another aspect of this disclosure is to automatically insert dunnage thereby improving the overall productivity and safety of the process, and reducing downtime of stopping and starting the process of inserting dunnage.

Another aspect of the present disclosure is to provide a packaging system that includes a supply of dunnage pieces, packing or installing stations, and an automated distribution assembly that selectively distributes the dunnage products from the supply to selected packing stations. The distribution assembly includes a dunnage holder system for receiving dunnage products.

Still another aspect of the disclosure is an automatic system and method for inserting dunnage, particularly discrete dunnage pieces, into a packing or shipping container, thereby avoiding or minimizing the need for a packer, and freeing the packer for other tasks.

The dunnage insertion device can be fitted to the Cut to Length process in a way which will be described within this specification.

Other aspects of the disclosure will become apparent upon a reading and understanding of the following detailed description.

BRIEF DESCRIPTION OF THE DRAWINGS

FIG. 5A is a front elevational view of a dunnage nailer assembly;

FIG. 5B is a side elevational view of the nailer of FIG. 5A;

FIG. 6A is an enlarged front elevational view of a dunnage nailer assembly;

FIG. 6B is a side elevational view of the nailer of FIG. 6A;

FIG. 6C is a top plan view of the nailer heads of FIG. 6A;

FIG. 6D is a top plan view of one of the nailer heads;

FIG. 13 is another perspective view of the dunnage discharge chute of FIG. 12.

DETAILED DESCRIPTION OF THE DISCLOSURE

Figure 1:
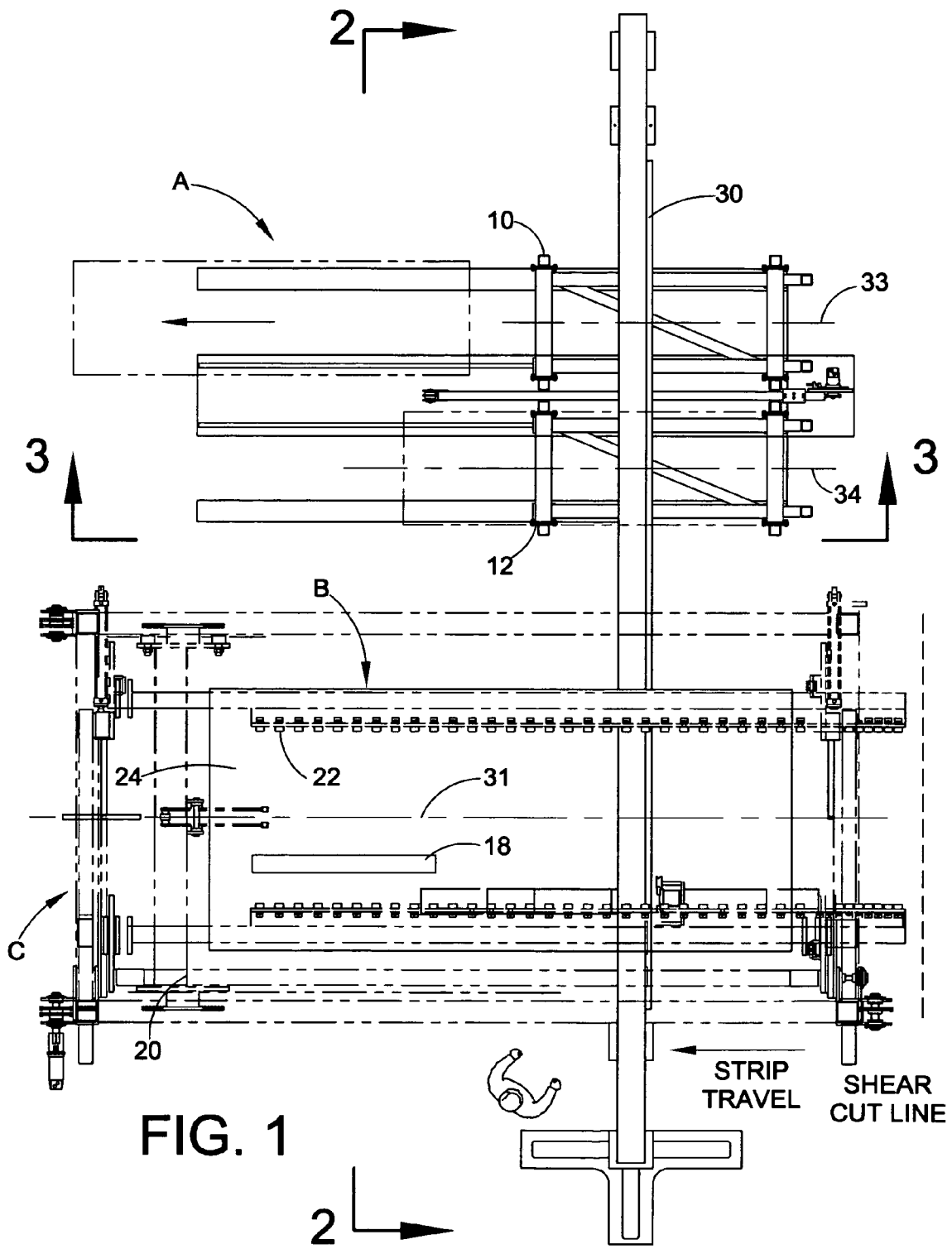
FIG. 1 is a top elevational view of a dunnage inserter system in accordance with one aspect of the disclosure.

With reference now to FIGS. 1-7, an automated dunnage inserter system in accordance with a first embodiment of the disclosure is shown and described. Referring to FIG. 1, a general arrangement of the dunnage inserter system A is shown.

The process line is typically known as a "Cut to Length Line" that automatically cut metal strip material that is fed from a coil. The coil is unwound, the strip is flattened and then a measured length of the strip is fed past a cutting shear and then on to a stacking device. The shear cut line is shown in FIG. 1.

The shear cuts the strip and the length of strip that is supported in the stacking device is released and allowed to drop onto a stack B of previously cut strips. The metal strips or sheets travel from right to left in FIG. 1. When the stack reaches a predetermined count or number of pieces, there is the need to insert spacers, known as "dunnage", to separate the counted "pack" from subsequent pieces that will continue to be dropped on the stack.

Separating the stack B of strips or pieces into counted piece packs has been previously accomplished by stopping the line and manually inserting the dunnage, or else the stack can continue to build higher than the required piece count. This large stack can be subsequently separated into counted packs after the stack is run out of the stacker area. Both of these approaches reduce productivity and require manual labor.

During operation, a sheared or cut metal sheet 24 is placed in the shipping or packing container or area C, then the dunnage is placed in the container to serve as spacers on top of one of the sheets, then another sheet is placed in the container, and so on. The dunnage pieces are spaced apart from each other along a length or width of the sheet. One or more dunnage pieces are lifted by a holder and are lowered and placed in a spaced apart manner in the container or storage area. The dunnage is usually used for shipping of the metal sheets and is retained during shipment in the metal sheet storage container C.

Figure 2:
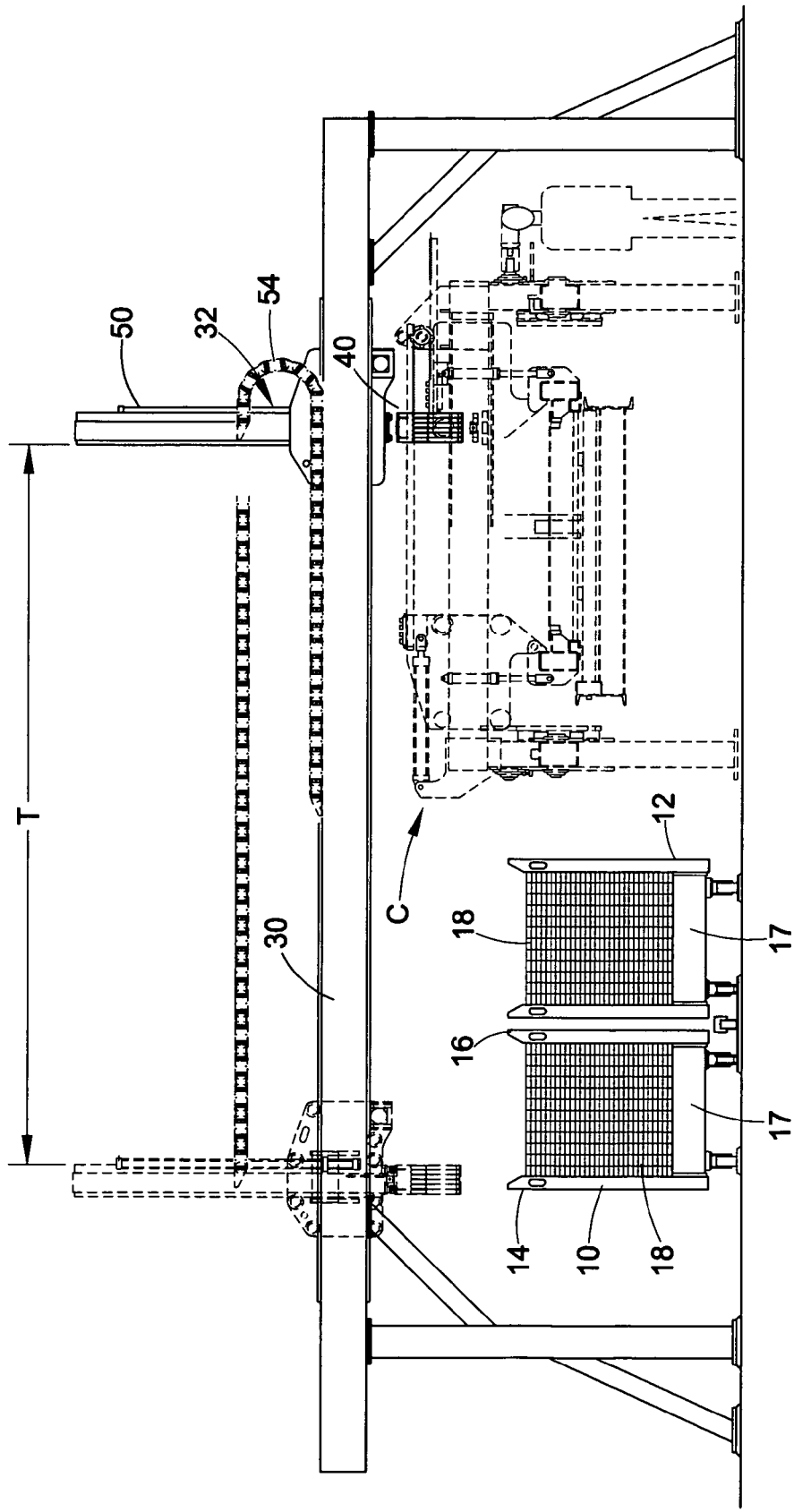
FIG. 2 is a side elevational view of the system of FIG. 1 taken along lines 2-2 of FIG. 1.
Figure 3A:
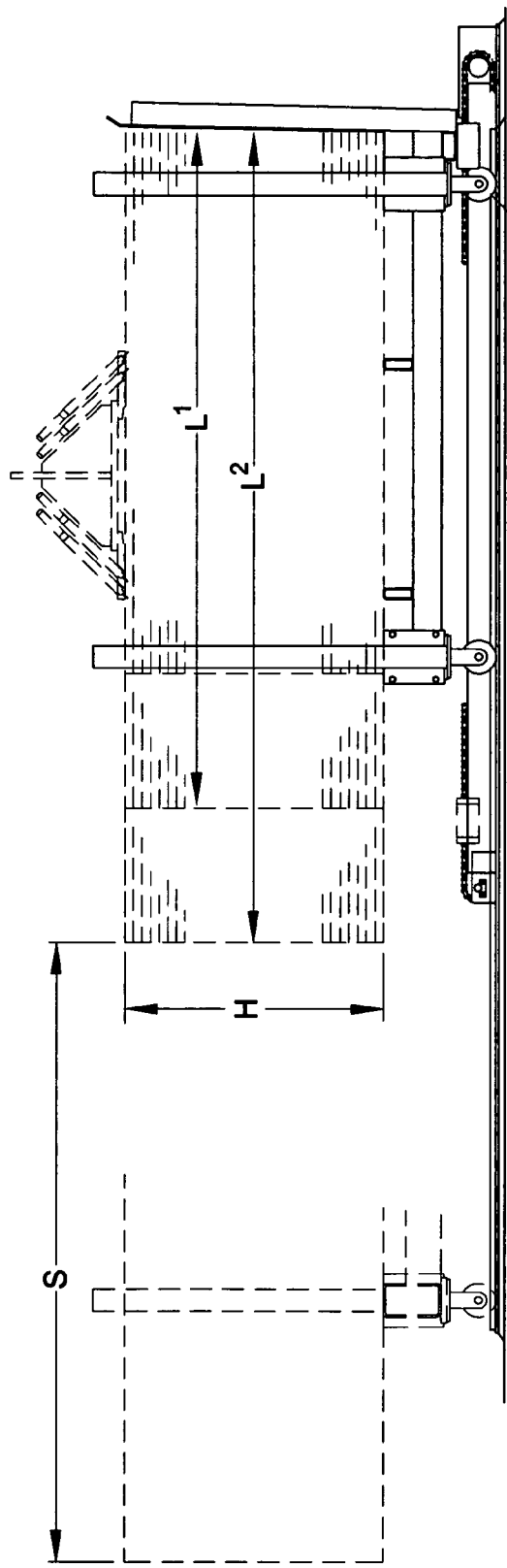
FIG. 3A is a side elevational view taken along lines 3-3 of FIG. 1.
Figure 3B:
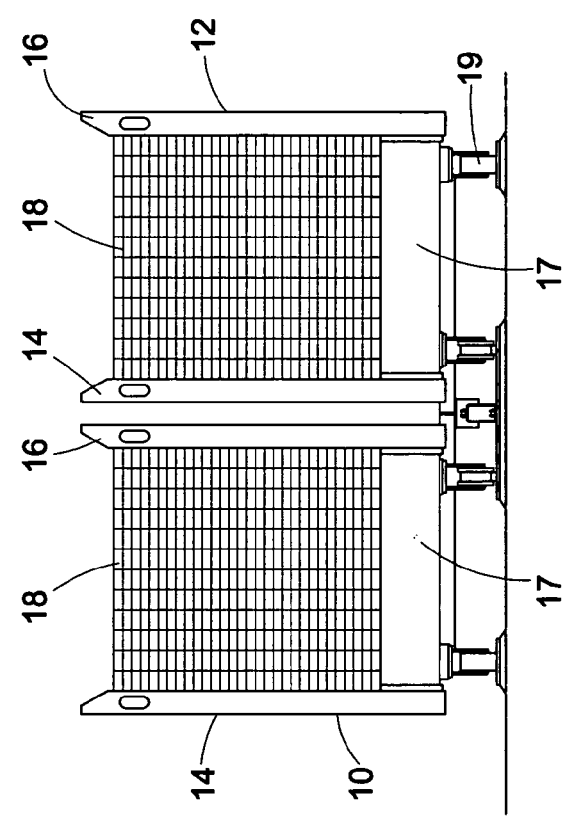
FIG. 3B is a front elevational view of the dunnage storage racks of FIG. 3A.

Specifically, referring to FIG. 1, parallel dunnage storage racks 10, 12 which are used to store bundles of dunnage pieces are shown. The racks slide out (to the left in FIG. 1) for loading with an overhead crane (not shown). Two storage racks 10, 12 are shown in FIGS. 1 and 2, but other numbers of racks can be used without departing from the scope of the disclosure. Referring to FIGS. 3A and 3B, the racks each have a pair of opposed parallel walls 14, 16 and a bottom wall 17 which form a container for holding dunnage pieces 18 in bundles or magazines or stacks. For example, the dunnage can be stacked in rows of twelve or so pieces which are adjacent to each other and stacked on top of one another. The dunnage 18 can be formed of various penetratable materials, such as wood (such as 2"×4" wood pieces) or soft plastic or a composite material. In FIG. 2, the dunnage is shown to be 2-inch by 4-inch pieces of wood which are stacked next to each other and on top of each other.

Referring to FIG. 3, a side elevational view of the dunnage storage racks 10, 12 along lines 3-3 is shown. Dunnage penetrating rods or "nails" 43 are used to penetrate the dunnage pieces and lift the pieces and install them into a container 20 containing sheet metal or other stacked material. The length of the dunnage can vary from about 96 inches ($L^1$) to about 144 inches ($L^2$) or more. The height (H) of the stack of dunnage can be about 45 inches or so. The dunnage storage racks have rollers or casters 19 to enable them to slide or roll about 120 inches (S) laterally to be reloaded with dunnage using an overhead crane (not shown). Each of these dimensions can vary without departing from the scope of the disclosure.

Referring to FIG. 1, a metal sheet storage rack 20 is shown from an overhead perspective. A series of roller rails or conveyors or belts 22 are used to move metal sheets into a stack 24 from a metal shear cutter (not shown) onto the storage rack or stacking container 20. Two parallel conveyors are shown. An overhead beam assembly 30 extends perpendicular to the longitudinal axes 31 of the metal sheet rack and the longitudinal central axes 33, 34 of the dunnage storage racks 10, 12. The beam extends over the metal storage rack and both of the dunnage storage racks. Mounted on the beam is an overhead trolley and lift assembly 32 (FIG. 2). Underneath the beam is mounted a dunnage nailer assembly 40 which includes up to twelve or more nailer heads 42 which include nails 43 mounted at an offset angle (such as 45 degrees) with respect to the dunnage. Alternatively, the nails can be positioned at 90 degrees with respect to the dunnage.

Figure 4:
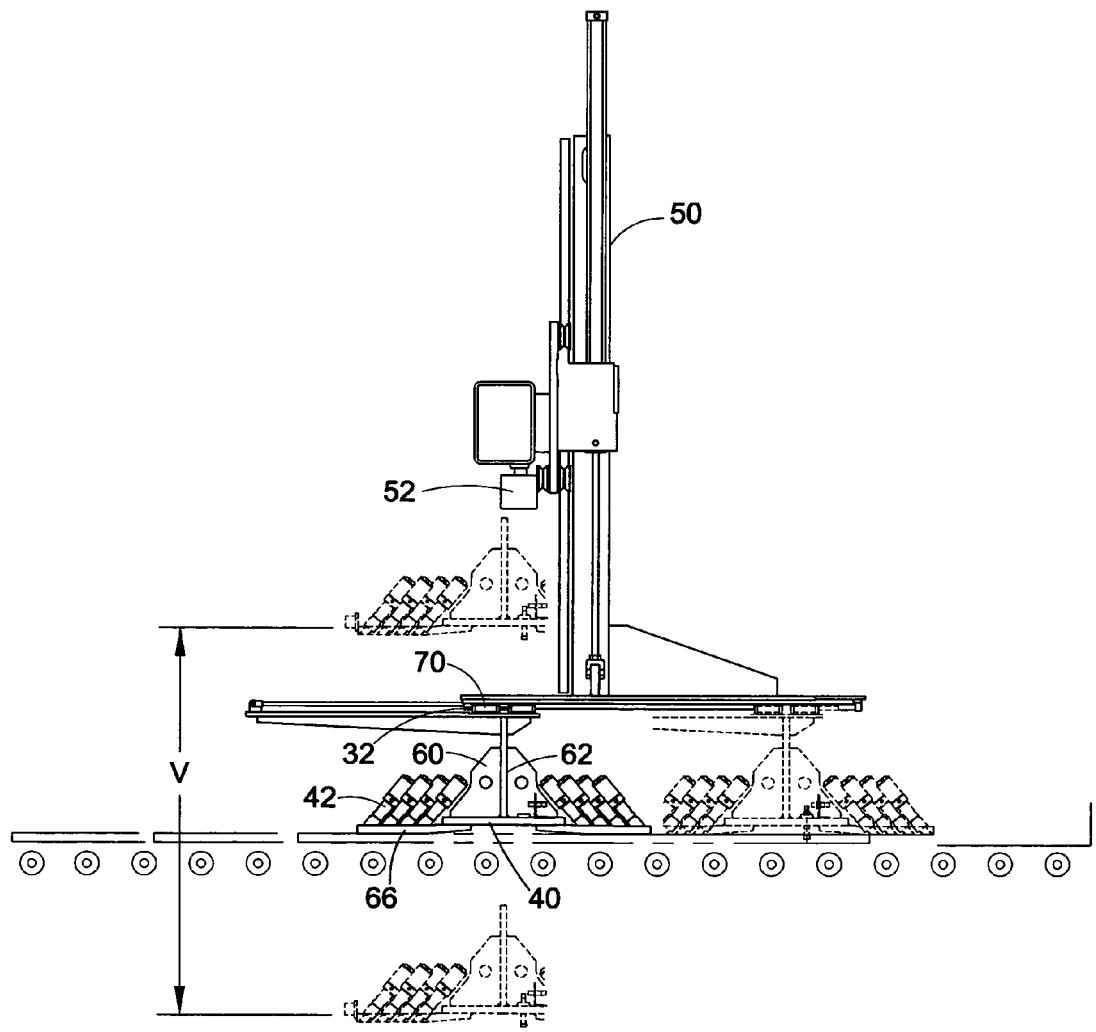
FIG. 4 is a front elevational view of a dunnage nailer assembly.

The nails are positioned on nailer heads 42 which are in turn connected to an electro-hydraulic cylinder 50 and motor 52 assembly, for moving the nailer head vertically and/or horizontally (see FIG. 4). Cylinder 50 is used for providing vertical movement, while motor 52 is used for providing horizontal movement. The electro-hydraulic cylinder can be a Parker Series 2HX model, for example. The hydraulic motor can be a Char-Lynn Eaton 2000 Series motor.

Referring to FIGS. 5A and 5B, a first powertrak conveyor assembly 54 is used to move the nailer head along a horizontal axis. The powertrak can be a Gleason Powertrak PT45E with a 14-foot chain length and a bend radius of about 11.22 inches. The powertrak can utilize tight radii horizontal and vertical bends, which offers total flexibility in routing and suits most conveyor layouts around a factory or warehouse. An added advantage of the powertrack conveyor is its modular construction, bolted support and clamp assemblies that allow layout modifications, conveyor extensions and re-routes to be easily completed over a short time scale therefore maintaining that any system downtime is kept to an absolute minimum.

A second powertrak conveyor assembly 56 is used to move the nailer head assembly in a vertical direction. Powertrak 56 can be a Gleason Powertrak PT38E with a 9-foot chain length and a bend radius of about 7.88 inches.

During operation, the hydroelectric cylinder 50 is actuated to move the nailer head in a vertical direction. The nailer head travels along a path formed by the powertrak 54 in a horizontal direction or by powertrak 56 in a vertical direction. As seen in FIG. 2, the nailer head can travel a horizontal distance T of about 20 feet between two horizontal end positions along the length of beam 30. Referring to FIG. 5B, powertrak 56 contains hoses 57 that supply fluid to the vertical lift hydraulic cylinder 50, which in turn raises and lowers nailer assembly 40. A first end 59 of the powertrak is attached to a portion 61 of the nailer assembly 40 that does not move up or down when the cylinder extends or retracts. Portion 61 has a bolt hole pattern 63 which receives fasteners to attach end 59 of the powertrak to portion 61.

A second end 65 of the powertrak 56 is attached to a vertical plate 67 which is attached to vertical column 69 which moves vertically up and down when cylinder 50 is extended and retracted.

Referring now to FIG. 5A, powertrak 54 accommodates horizontal movement of the nailer head. Powertrak 54 contains hoses and wiring for supplying the function of firing the nailers and the horizontal and vertical motions of the nailer head assembly 40. Hoses for the powertrak 54 are routed to powertrak 56. The hoses extend through powertrak 56 and are connected to vertical lift cylinder 50.

Referring to FIG. 4, hydraulic motor 52 traverses and moves the nailer head horizontally, or into and out of the page on FIG. 4. That is, along the longitudinal axis of the overhead beam 30. The hydraulic motor has a shaft which has a pinion gear that is engaged on a horizontal gear track. The gear track in turn is fixed to overhead beam 30. Nailer head assembly 40 is supported by V-groove wheels 41 that ride within V-shaped rails that are attached to overhead beam 30.

As seen in FIGS. 4 and 5A, the two extreme horizontal positions are shown in solid lines and phantom lines. As seen in FIG. 4, the nailer head can travel a vertical distance V of about 66 inches. The various vertical positions of the nailer are shown in phantom in FIG. 4.

Figure 7:
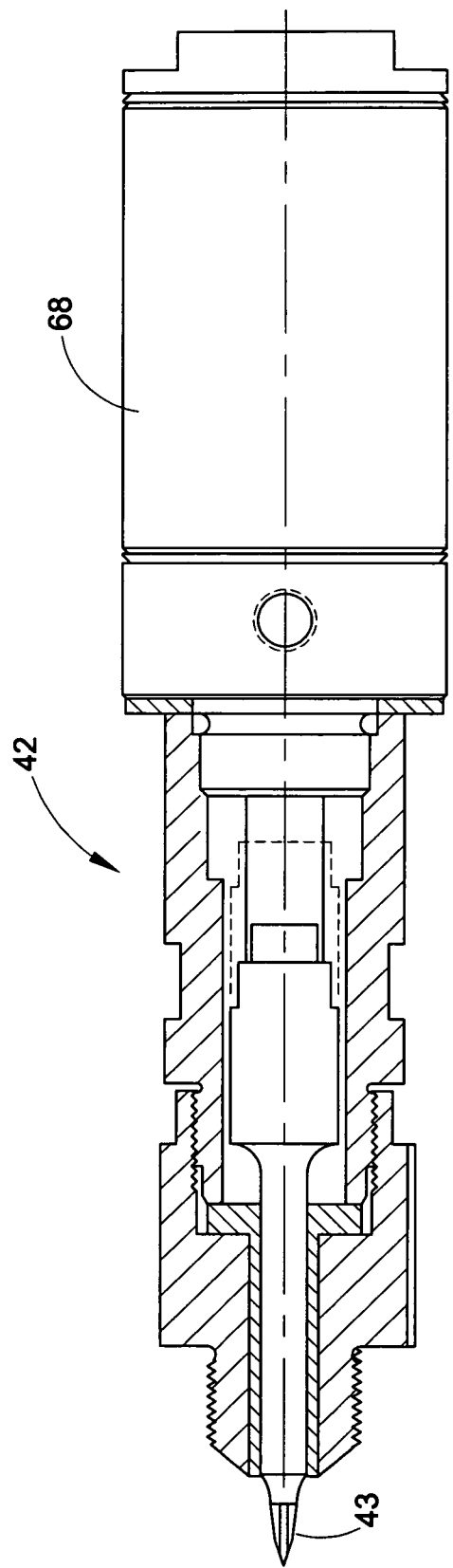
FIG. 7 is a side and cross sectional view of a dunnage nailer of the dunnage inserter system.

The nailer head assembly 40 is shown in detail in FIGS. 6 and 7. The nailer heads 42 are shown in an offset angle configuration. A total of twelve nail heads 42 are shown on opposite sides of the nailer assembly, but other configurations and numbers of nailers are contemplated by the disclosure. A central plate 60 is connected to a vertical beam 62 which in turn is connected to the overhead beam 30. Shims 66 can be used to align the nails.

Referring now to FIG. 7, the nail heads 42 have a double acting air cylinder 68 which can have a one-inch stroke for moving the nail 43 into and out of contact with the dunnage piece. The nails can preferably pick up four or more pieces of dunnage at the same time. Guides 70 such as rolls or cylinders may allow the nailer to slide or move along a track 72 or the underside of the beam assembly 30.

During operation, the overhead trolley and lift assembly 32 includes powertrak 54 for moving the nailer 40 laterally between the dunnage racks and the container 20. The dunnage nailer head 40 moves along beam assembly 30 laterally from left to right from a first position to a second position as shown in FIG. 2.

The nailer 40 further is hydraulically moved vertically to be lowered to penetrate and latch onto or grip the dunnage pieces and lift them vertically to the container 20. The nailer can lift one or more dunnage pieces simultaneously (up to about six dunnage pieces).

Referring now to FIGS. 6A-6D, the rods or nails 43 are shown at an offset angle with respect to the dunnage, but also can be positioned vertically (at 90 degrees) with respect to the dunnage. Two nails (in opposing directions) penetrate one of the dunnage pieces or boards, and an appropriate number of dunnage pieces (up to six or more dunnage pieces) can be lifted and moved at one time. Sometimes only one or two dunnage pieces may be appropriate. Twelve offset parallel nails 42 are shown in FIGS. 6C and 6D. Twelve nails have an angle <θ of around 45°, and extend to the left edge 45 of the dunnage nailer. Twelve additional nails 42 have an angle λ of about 135° from horizontal, and extend to a right edge 47 of the nailer. The dunnage is transferred by the "nail" and a trolley and lift assembly 32 shown in FIG. 5. The nails 42 are shown in a staggered or offset configuration and at an angle with respect to a vertical orientation. A sectional view of the nail 42 is shown in FIG. 7.

The dunnage holder penetrates the dunnage or boards with a tip 43 of the nail 42 and transfers the dunnage to the container 20 holding the stacked sheets of metal or other material, such as plywood. The dunnage is used to separate the stacks of product or sheets, and act as spacers between the stacks of products. The dunnage usually remains in place during shipment.

During operation, referring to FIG. 1, a sheet 24 is placed in the shipping or packing container or area 20. A piece of dunnage 18 is placed in the container to serve as spacers on top of one of the sheets, and then another sheet is placed in the container, and so on. The dunnage nailer head or holder 40 is moved in a horizontal direction along beam 30 using the powertrak 54 and hydraulic motor 52 until the nailer assembly 40 is positioned over one of the dunnage pieces 18 in one of the racks 10, 12. Then, using the powertrak 56 and the hydraulic cylinder 50, the dunnage nailer assembly 40 is lowered into contact with one of the dunnage pieces. The cylinder 68 is activated in each of the nailer heads 42 used and at least two opposed heads has a nail 43 which is extended into contact with the dunnage pieces. The dunnage nails are angled to act as wedges, which penetrate the dunnage and wedge into the dunnage piece to prevent dropping the dunnage as it is moved to the packing container. Usually, two nails 43 angled in opposite directions are used to penetrate and lift one dunnage piece. Alternatively, the nails 43 can be vertically oriented and may be thicker or of a heavier gauge or material and be stronger so possibly only one nail is needed to lift the dunnage. A problem with orienting the nails at an angle is that it increases the likelihood of hitting a knot in the wood of the dunnage piece. One or more dunnage pieces are then lifted by the holder 40 and are lowered and placed in a spaced apart manner in the container or storage area 20 onto a metal sheet 24.

For example, four dunnage pieces can be picked up at the same time by four sets of the nailer heads 42. Then, the dunnage nailer assembly with the pieces of dunnage attached via nails 43 is moved vertically then horizontally over to the metal storage rack 20. Then, each dunnage piece is released from the nailer heads 42 into the metal sheet 24 in spaced apart and possibly parallel configurations. Once all of the desired dunnage pieces are lowered into position on a metal sheet, another metal sheet is sheared and cut and lowered onto the dunnage, and over the previous metal sheet in the storage rack 20. The process is then repeated.

By automating the movement of the dunnage pieces, instead of moving them by hand, an increase in time and cost efficiency results. Over packing or under packing of the dunnage is minimized, thus maximizing the use of dunnage pieces, and the packers are free to work on other tasks.

Figure 8:
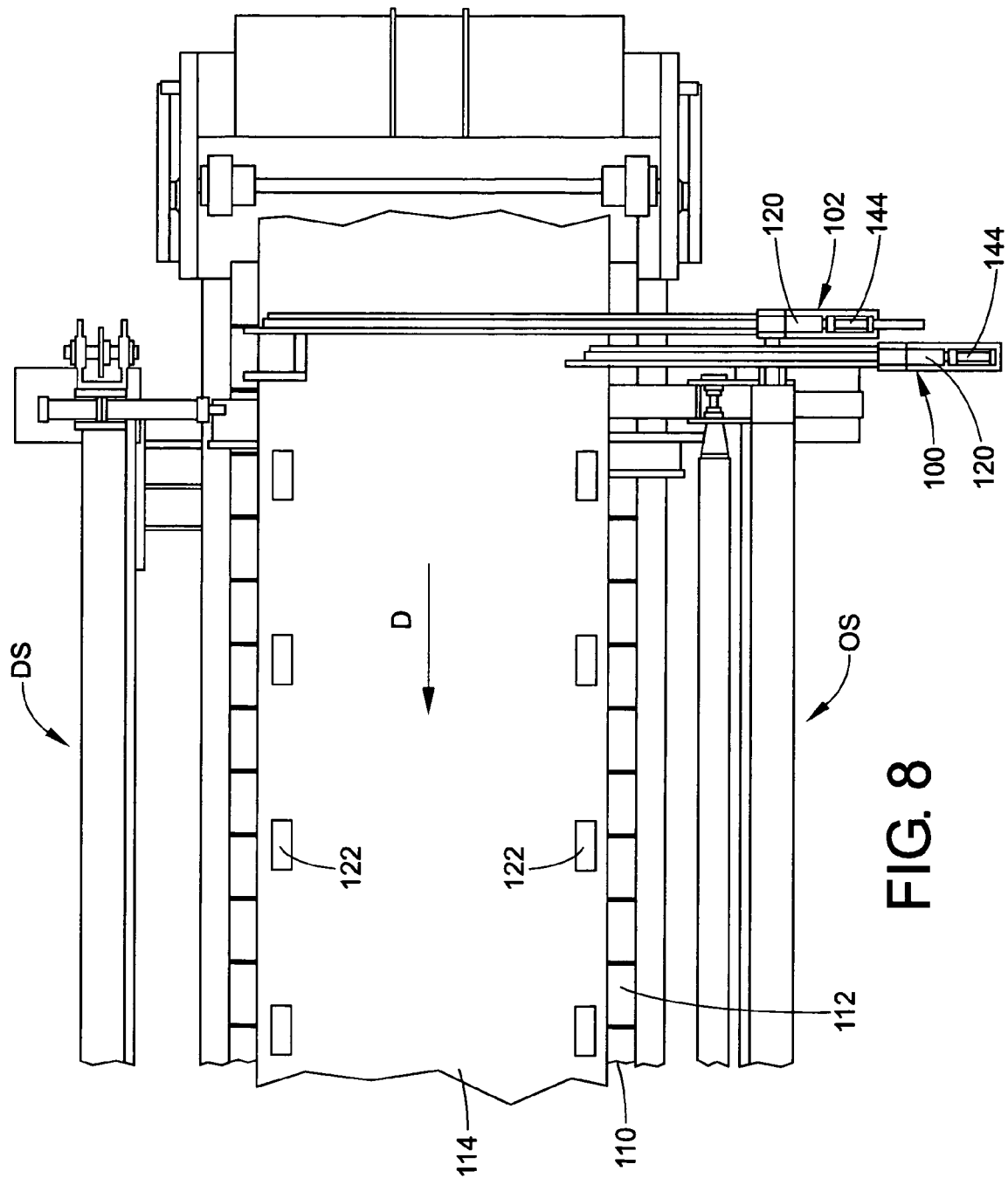
FIG. 8 is a top plan view illustrating dunnage insertion devices in accordance with another aspect of the disclosure.
Figure 9:
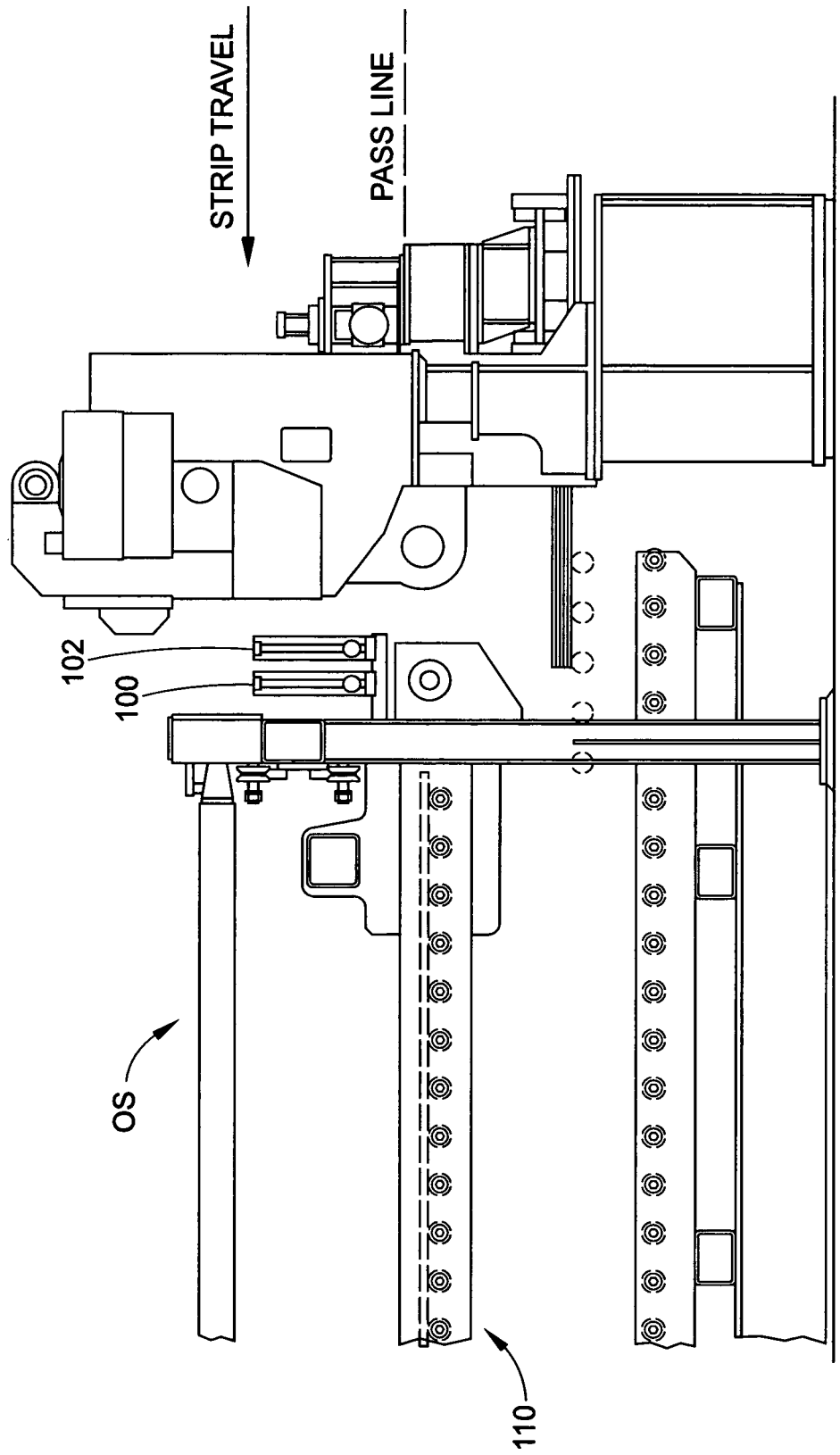
FIG. 9 is a side elevational view of the dunnage insertion devices of FIG. 8.
Figure 10:
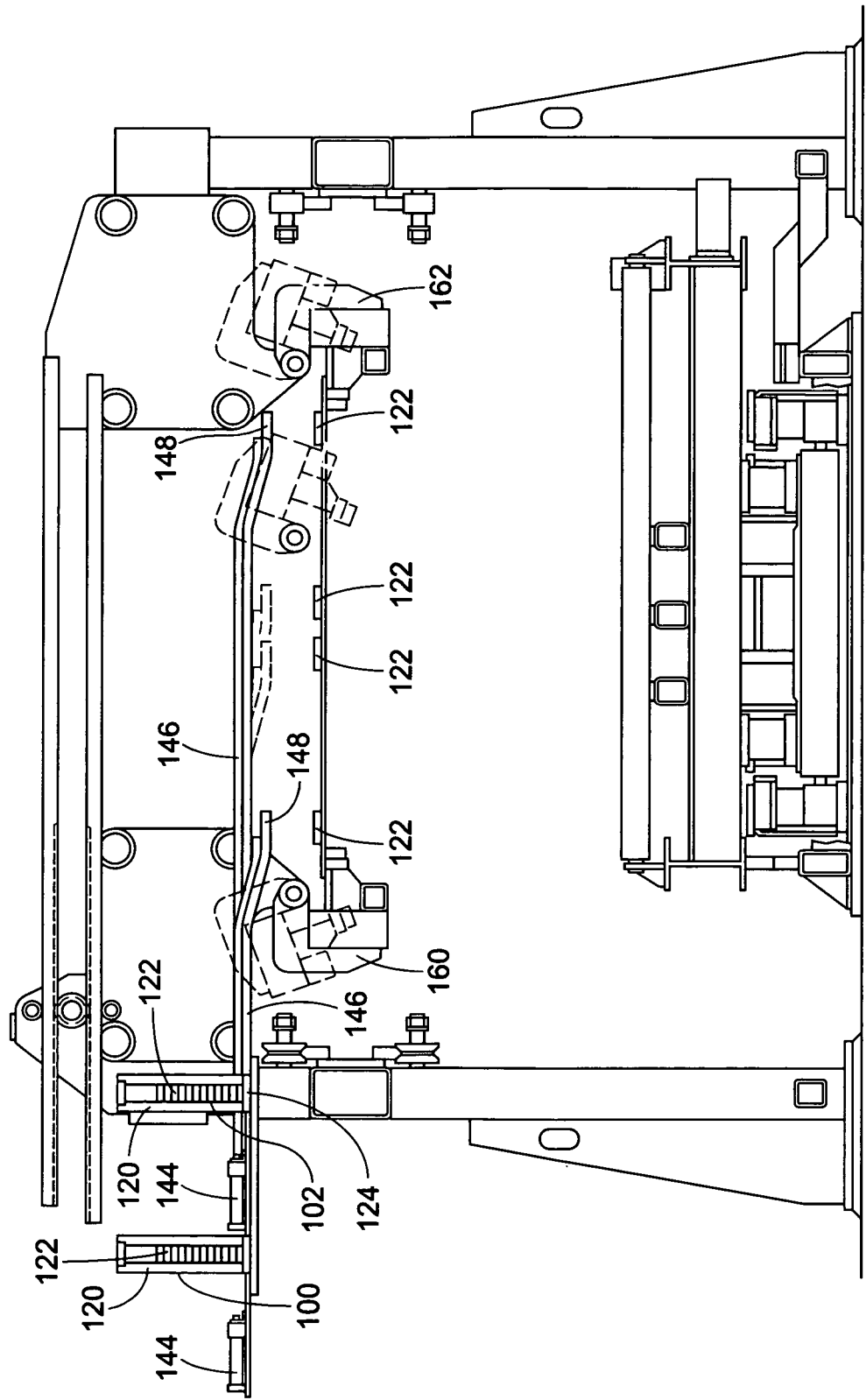
FIG. 10 is an across machine elevational view of the dunnage insertion device of FIG. 8.

Referring now to FIGS. 8-13, another embodiment of the disclosure is shown mounted to a typical stacker. Referring now to FIG. 8, a plan view depicting two dunnage insertion devices 100, 102 is shown. Device 100 will be referred to as the "Operator Side Inserter." Device 102 will be identified as the "Drive Side Inserter." The operator side of metal sheet or strip stacker 110 is designated "OS" and the drive side of the stacker is designated "DS". The metal strip or storage rack 110 is shown from an overhead perspective. A series of parallel roller rails or conveyors 112 are positioned on opposite sides of the rack 110 to move metal sheets 114 from a metal shear cutter (not shown) onto the storage rack or container 110 in the direction of arrow D. FIG. 9 is a side elevation of the two insertion devices 100, 102 and FIG. 10 is an across machine view of the two devices 100, 102.

Referring now to FIG. 10, and more specifically the drive side inserter 102, each device includes a magazine storage rack 120 for storing a number or magazine 121 of discrete pieces of dunnage 122. The shape of the dunnage inserts may be square, rectangular or round or any suitable shape or configuration. The dunnage can be made of various penetratable materials, such as wood or soft plastic or a composite material.

The magazine storage rack 120 stores the discrete dunnage 122 in a generally vertical orientation, such that gravity assists the feeding of the dunnage into an ejection zone 124 at the base of the rack 120. Springs or other additional force means can be used to assure the stack of dunnage is kept tight with respect to the ejection zone.

Figure 11:
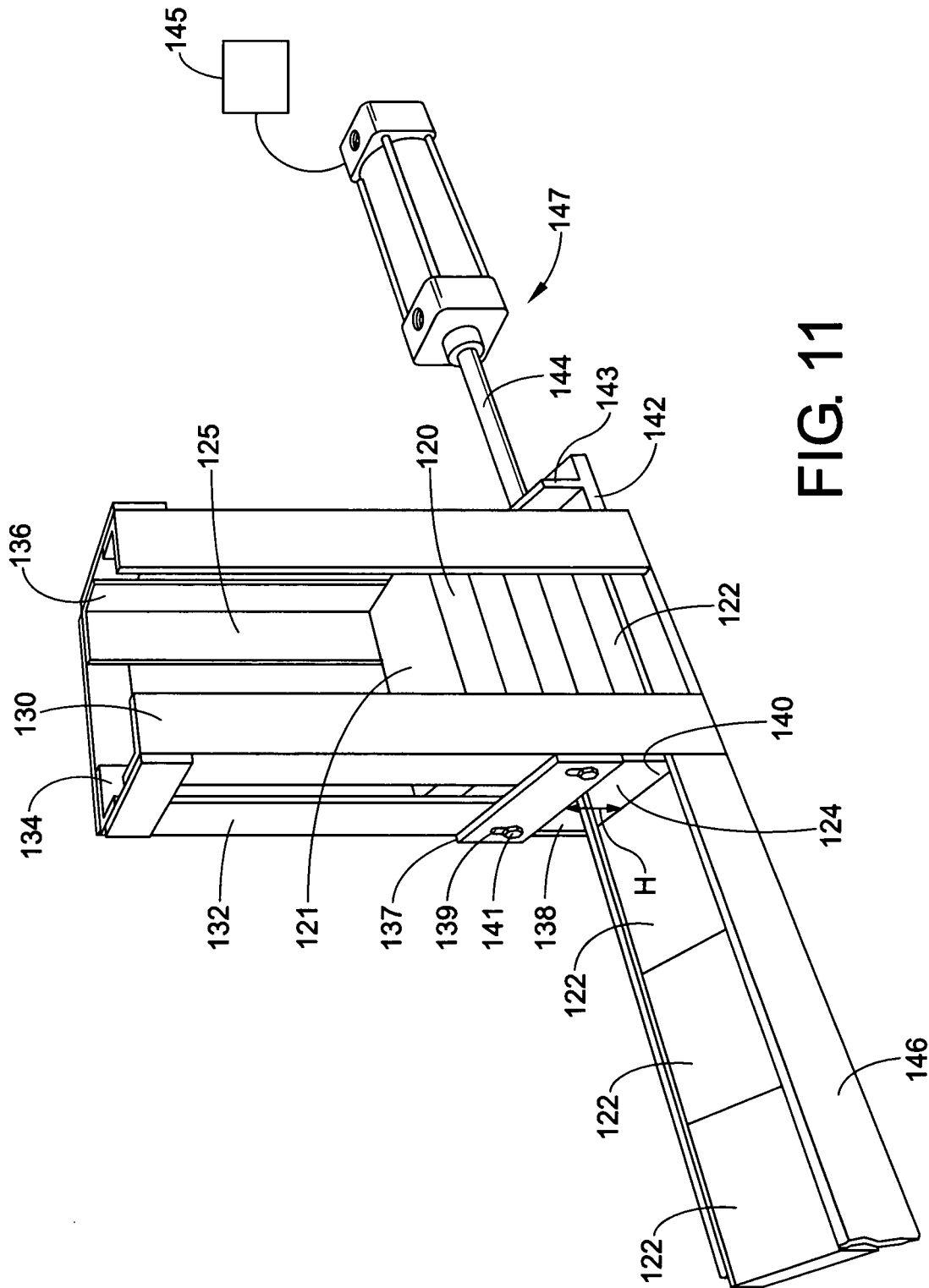
FIG. 11 is a perspective view of a dunnage ejection system.

Discrete dunnage pieces 122 can be added to the magazine 120 by direct manual insertion or by entry chutes (not shown) that direct the dunnage to the magazine, thus keeping the loading zone further away from the process line. The magazine confines and organizes the dunnage such that individual pieces will not jam as they progressively drop into the ejection chamber. Referring now to FIG. 11, an enlarged view of the magazine storage rack 120 is shown with a number of discrete dunnage pieces 122 stacked in the magazine or storage rack 120. The magazine has opposed walls 130, 132, 134, 136 which can be L-shaped or rectangular, which form a square or rectangular enclosure 125 for holding and storing the dunnage pieces.

Discrete dunnage pieces 122 have a preferred shape of a rectangle of sufficient thickness to allow easy separation of the counted packs (i.e., sheets of steel in the stacker). The dunnage material can be fabricated from wood (such as a common 2"×4") or a thermoplastic material similar to a hockey puck, a composite material or any suitable material that has low rebound properties. Oftentimes, the discrete dunnage is not used for shipment purposes and only for temporary storage of sheets.

Once the discrete dunnage is ejected, it falls onto the steel sheets and must generally stick to metal sheet as the sheet is dropped onto the stack. A magnetic surface 123 could be added to a face or side of the dunnage 122 to assist in adhering to a metal sheet 114.

Referring still to FIG. 11, an ejector chamber 124 is shown. The ejector chamber is a lower portion of the rack 120 which is formed by the walls 130, 132, 134, 136 and a wall 137 or plate which is mounted to one of walls 130, 132, 134, 136. Plate 137 is adjustably mounted via elongated slots 139 which receive bolts or other fasteners 141. A piece of dunnage 122 is staged in the ejector chamber and ready for discharge. The ejector chamber 124 includes an ejection slot or opening 138 that has a height H slightly higher than the thickness of the dunnage, a bottom surface 140 that is stationary, and an ejector slide 142 that abuts against one face of the dunnage. The shape of the interior enclosure of the ejector chamber confines the dunnage in a manner that keeps it aligned with the ejection slot.

Ejector slide 142 is positioned on the opposite side of the rack from opening 138. Slide 142 is used to push the dunnage out from under the "magazined" stack of dunnage and discharges the dunnage onto the last counted metal sheet (FIG. 10). FIG. 10 shows several pieces of discrete dunnage 122 deposited on the metal sheet 114.

During the ejection motion, a top surface 143 of the ejector slide 142 supports the stack of dunnage and prevents the stack from falling into the ejection chamber. Once a piece of dunnage is ejected, the ejector slide quickly retracts and the stack of dunnage drops a piece of dunnage into the ejection chamber.

Referring still to FIG. 11, in the preferred embodiment, ejector assembly 147 includes a pneumatic cylinder 144 that attaches to the ejector slide 142. A control circuit 145 is used to trigger the ejection of the dunnage. When the control circuit triggers ejection of a piece of dunnage, the pneumatic cylinder 144 pushes on the ejector slide 142, which pushes the dunnage piece out of the ejector chamber 124 and into a discharge chute 146. In turn, a piece of dunnage is pushed out of and drops out of the discharge chute and onto the steel or metal strip 114 in the stacker.

At the end of the push cycle, the pneumatic cylinder 144 retracts thereby retracting the ejector slide 142, clearing the ejection chamber and allowing another discrete piece of dunnage to drop into and enter the chamber 124.

Typically, the dunnage inserter will eject multiple rounds or dunnage pieces 122 onto the metal strip 114. The number and location of placement of the rounds or dunnage is dependent on metal sheet length and width.

The dunnage inserter can be accessorized with additional chutes and can be mounted in a manner that allows the ejector to be automatically positioned to the width of the metal strip. Multiple inserters could also be mounted in series to the metal strip stacking container.

Figure 12:
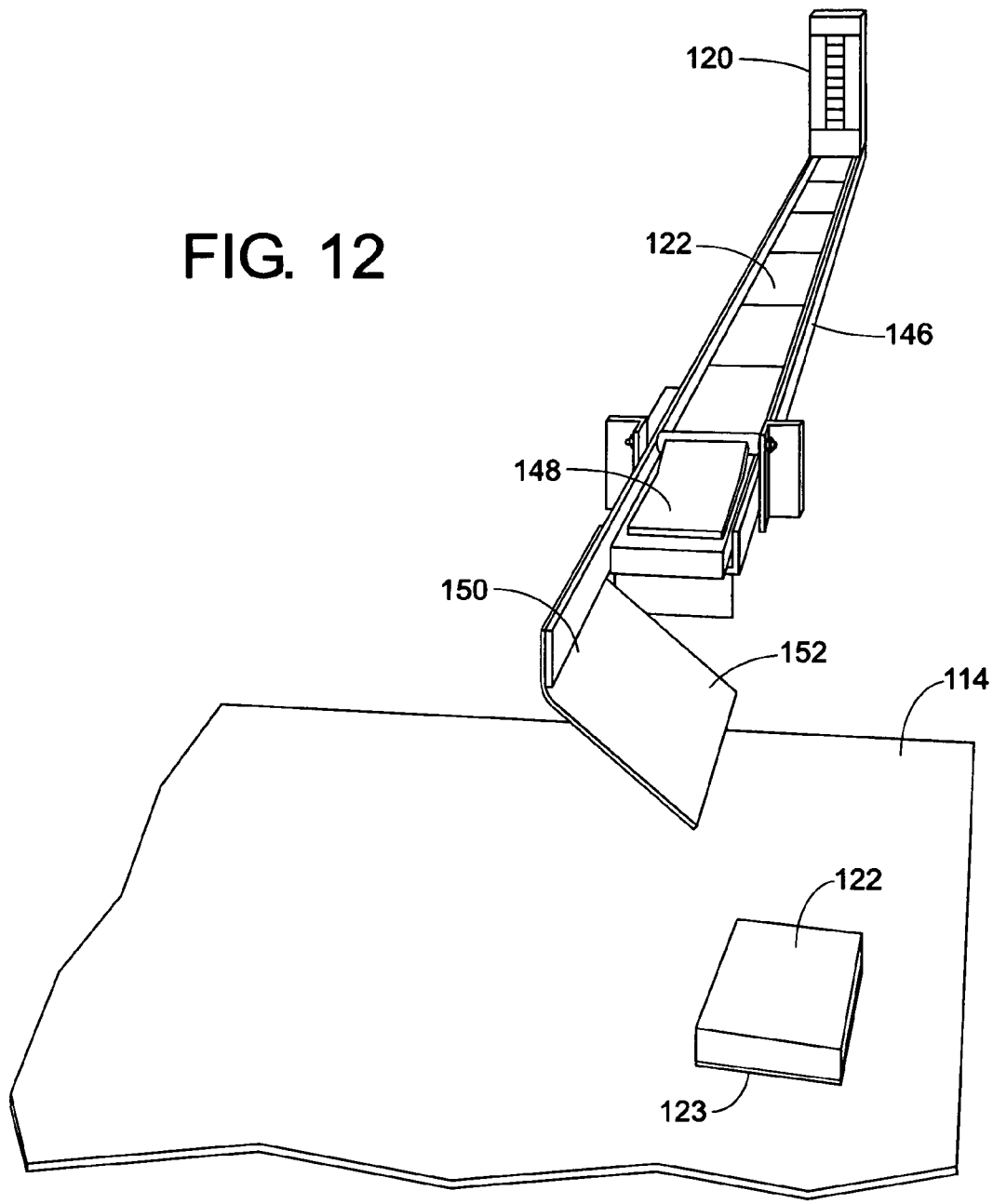
FIG. 12 is a perspective view of a dunnage discharge chute of the ejection system of FIG. 11.

As can be seen in FIGS. 12 and 13, it is generally intended for discharge chute 146 to be "packed full" from the ejector chamber 124 to a discharge gate 148 formed at a distal end of the chute opposite the ejector chamber. That is, a series of dunnage pieces are lined up next to or abut each other in series along the longitudinal length of the discharge chute 146. When one piece of dunnage 122 is ejected into the discharge chute, it pushes laterally against an adjacent piece of dunnage in the packed row of dunnage which in turn allows one piece of dunnage to move past or over the discharge gate. This minimizes downtime of the system, since the dunnage can be continuously fed onto the metal sheet. The discharge gate 148 can use a combination of weight and torsion springs to control the velocity of the dunnage as it moves past the gate.

The discrete piece of dunnage that exits past the discharge gate 148 drops or falls onto a discharge deflector 150. The discharge deflector has an angled surface 152 and proportioned to allow the dunnage to assume a horizontal velocity that approximates the horizontal velocity of the steel sheet that is passing underneath the discharge deflector as the dunnage is dropped onto the metal sheet.

Typically, the dunnage inserter will eject multiple discrete pieces of dunnage 122 onto the metal sheet 114 as it passes underneath (FIG. 10). The number and location of placement of the dunnage is dependent on metal sheet length and width. The dunnage inserters are mounted to stacker drop arms. Referring to FIG. 10, the ejector portion of the inserter is rigidly mounted to an operator's side stacker drop arm 160. The discharge chute is slidably mounted to a drive side stacker drop arm 162. The drop arms pivot or rotate between the two positions (one shown in phantom) in FIG. 10. When the stacker drop arms adjust for sheet width, the inserter is inherently repositioned to the new width.

Obviously, a wide range of possibilities exist for the configurations of the discharge chutes and loading magazines and chutes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A dunnage inserter system, comprising:
   at least one storage container for storage of a plurality of dunnage pieces;
   an overhead beam which extends from said at least one storage container to an associated metal sheet;
   a trolley and lift assembly slidably mounted to said overhead beam assembly to travel horizontally along a longitudinal axis of a said overhead beam; and
   a dunnage holder which is mounted to said trolley and lift assembly, said dunnage holder comprises a dunnage retaining member which selectively engages one or more dunnage pieces;
   wherein said dunnage holder moves horizontally along said overhead beam and moves vertically via said lift assembly;
   wherein said dunnage holder can lift and hold one or more dunnage pieces for installation onto the associated metal sheet; wherein said dunnage holder first moves said dunnage retaining member and said dunnage piece in a horizontal direction in alignment with said metal sheet and then moves said dunnage retaining member and said dunnage piece in a vertical direction and releases said dunnage piece into contact with said metal sheet.

2. The dunnage inserter system of claim 1, wherein said trolley and lift assembly comprises a first powertrak conveyor for moving said dunnage holder in a horizontal direction.

3. The dunnage inserter of claim 2, wherein said trolley and lift assembly comprises a second powertrak conveyor for moving said dunnage holder in a vertical direction.

4. The dunnage inserter system of claim 1, wherein said trolley and lift assembly comprises a hydraulic cylinder attached to said dunnage holder for moving said holder in a vertical direction.

5. The dunnage inserter system of claim 1, wherein said trolley and lift assembly comprises a hydraulic motor attached to said dunnage holder for moving said holder in a horizontal direction.

6. The dunnage inserter system of claim 1, wherein said dunnage pieces have a length in the range of 96 inches to 144 inches.

7. The dunnage inserter system of claim 1 wherein said dunnage retaining member comprises a first set of dunnage nails and a second set of dunnage nails.

8. The dunnage inserter system of claim 7, wherein said first set of dunnage nails are parallel to each other and offset at an angle with respect to a vertical axis of said dunnage holder.

9. The dunnage inserter system of claim 8, wherein said second set of dunnage nails are parallel to each other and offset at an angle with respect to a vertical axis of said dunnage holder.

10. The dunnage inserter system of claim 9, wherein said second set of dunnage nails comprises twelve nails.

11. The dunnage inserter system of claim 9, wherein at least one nail of said first set of dunnage nails and at least one nail of said second set of dunnage nails engages a single piece of dunnage.

12. The dunnage inserter system of claim 8, wherein said first set of dunnage nails comprises twelve nails.

13. The dunnage inserter system of claim 7, wherein each of said nails of said first set of dunnage nails and said second set of dunnage nails comprises an air cylinder for moving a tip of said nail into and out of contact with a dunnage piece.

14. The dunnage inserter system of claim 1, wherein said dunnage pieces are formed of wood.

15. A method of inserting dunnage onto a metal sheet storage rack, comprising:
   providing a container storing a plurality of dunnage pieces;
   providing an overhead beam extending between said container storing a plurality of dunnage pieces and said metal sheet storage rack;
   providing a trolley and lift assembly on said overhead beam;
   providing a dunnage holder mounted to said trolley and lift assembly;
   moving said dunnage holder to a position above said dunnage container;
   lowering said dunnage holder via said trolley and lift assembly until said holder contacts at least one of said dunnage pieces;
   engaging said at least one dunnage piece with said holder via a dunnage retainer member;
   lifting said holder and said dunnage retaining member and said at least one dunnage piece via said trolley and lift assembly;
   moving said dunnage holder and said dunnage retaining member and said at least one dunnage piece in a horizontal direction over said metal sheet storage rack;
   lowering said at least one dunnage piece in a vertical direction onto a metal sheet within said metal storage rack; and
   releasing said at least one dunnage piece onto said metal sheet by disengaging said dunnage retaining member from said at least one dunnage piece.

* * * * *